US011272185B2

(12) United States Patent
Liu et al.

(10) Patent No.: US 11,272,185 B2
(45) Date of Patent: Mar. 8, 2022

(54) HIERARCHICAL MEASUREMENT OF SPATIAL ACTIVITY FOR TEXT/EDGE DETECTION

(71) Applicant: ATI Technologies ULC, Markham (CA)

(72) Inventors: Yang Liu, Markham (CA); Haibo Liu, Markham (CA); Ihab M. A. Amer, Markham (CA); Crystal Yeong-Pian Sau, Markham (CA); Jinbo Qiu, Markham (CA); Boris Ivanovic, Markham (CA); Gabor Sines, Markham (CA); Wei Gao, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/176,699

(22) Filed: Oct. 31, 2018

(65) Prior Publication Data
US 2020/0137396 A1 Apr. 30, 2020

(51) Int. Cl.
*H04N 19/14* (2014.01)
*H04N 19/124* (2014.01)
*H04N 19/176* (2014.01)

(52) U.S. Cl.
CPC ........... *H04N 19/14* (2014.11); *H04N 19/124* (2014.11); *H04N 19/176* (2014.11)

(58) Field of Classification Search
CPC ..... H04N 19/14; H04N 19/124; H04N 19/176
USPC .................................................. 375/240.03
See application file for complete search history.

(56) References Cited

U.S. PATENT DOCUMENTS

| 8,064,516 B2* | 11/2011 | Kojokaro ............. H04N 19/139 375/240.03 |
| 2003/0053708 A1 | 3/2003 | Kryukov et al. |
| 2003/0059110 A1 | 3/2003 | Wilt |
| 2006/0274833 A1* | 12/2006 | Kojokaro ............... H04N 19/14 375/240.16 |
| 2007/0074266 A1* | 3/2007 | Raveendran ........... H04N 19/36 725/135 |
| 2010/0080459 A1 | 4/2010 | Dai et al. |
| 2011/0026582 A1 | 2/2011 | Bauza et al. |
| 2013/0094771 A1 | 4/2013 | Chaudhuri et al. |
| 2013/0121573 A1 | 5/2013 | Shen et al. |
| 2014/0289423 A1* | 9/2014 | Kim ...................... G06F 3/1454 709/233 |
| 2015/0010233 A1 | 1/2015 | Barman et al. |
| 2015/0125090 A1 | 5/2015 | Mizobuchi et al. |
| 2016/0014421 A1* | 1/2016 | Cote .................... H04N 19/196 382/170 |
| 2017/0201769 A1* | 7/2017 | Chon ................... H04N 19/593 |
| 2018/0108327 A1 | 4/2018 | Jung et al. |

(Continued)

OTHER PUBLICATIONS

U.S. Appl. No. 16/146,198, filed Sep. 28, 2018.

*Primary Examiner* — Patricia I Young
(74) *Attorney, Agent, or Firm* — Volpe Koenig (57) ABSTRACT

A system and method for dynamically changing encode quality at a block level based on runtime pre-encoding analysis of content in a video stream. A video encoder continuously analyzes the content during runtime, and collects statistics and/or characteristics of the content before encoding it. This classifies the block among pre-defined categories of content, where every category has its own compression parameters.

17 Claims, 9 Drawing Sheets

(56) References Cited

U.S. PATENT DOCUMENTS

2018/0330529 A1* 11/2018 Maruyama .............. G06T 11/60
2019/0188835 A1 6/2019 Loginov et al.

* cited by examiner

HIERARCHICAL MEASUREMENT OF SPATIAL ACTIVITY FOR TEXT/EDGE DETECTION

BACKGROUND

Video encoders are typically used to compress the video data and reduce the amount of video data transmitted. Rate control is a process that takes place during video encoding to maximize the quality of the encoded video while adhering to the different bitrate constraints. Different parameters such as Quantization Parameter (QP) are typically changed by the video encoder to adapt to the available bitrate. QP values can be changed at different levels including per frame or per block. Changing QP values has a significant impact on the fidelity and quality of the encoded content since a higher QP means a greater loss of details during the quantization process.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to a system and method for detecting graphical edges based on analysis of content in a video stream. Frames of video are divided into blocks. A divider then divides each of the blocks into sub-blocks. A calculator determines the variance for each sub-block based on the content of each sub-block. An analyzer analyzes the calculated variances of each sub-block to identify the type (a "classification") of content contained in each block. A variety of techniques for generating a classification based on an analysis of the variance of the sub-blocks are provided herein. One example technique includes calculating a block variance based on the variance of each of the sub-blocks and comparing the block variance to a threshold. Other techniques for determining a classification based on the variances of the sub-blocks are possible as well.

The type indicates one of a high likelihood of hard edges in the block or a low likelihood of hard edges in the block. In sum, the analysis performed based on the variance of the sub-blocks in a block produces a type that indicates whether a block is likely to contain hard edges (such as those that are present when computer text is a part of the block) or is not likely to contain hard edges (as is the situation where "natural video" containing little or no computer graphics or text exists within the block).

The determined type is subsequently used for any of a variety of purposes. In one example, the above technique is incorporated into a video encoder. A pre-processing analyzer analyzes the video and classifies each block according to one of the above types. The encoder encodes blocks that are classified as likely to contain hard edges with more bits than blocks that are classified as not likely to contain hard edges. Affording more bits to blocks likely to have hard edges allocates bits to those blocks whose discernibility would suffer from a lower number of bits. In some examples, the bits are allocated away from other blocks for which the discernibility is less affected by that loss of bits. As a result, a better visual experience for a viewer is achieved in encoded video. Other take and give approaches can be used as well depending on preferences and applications.

Figure 1A:
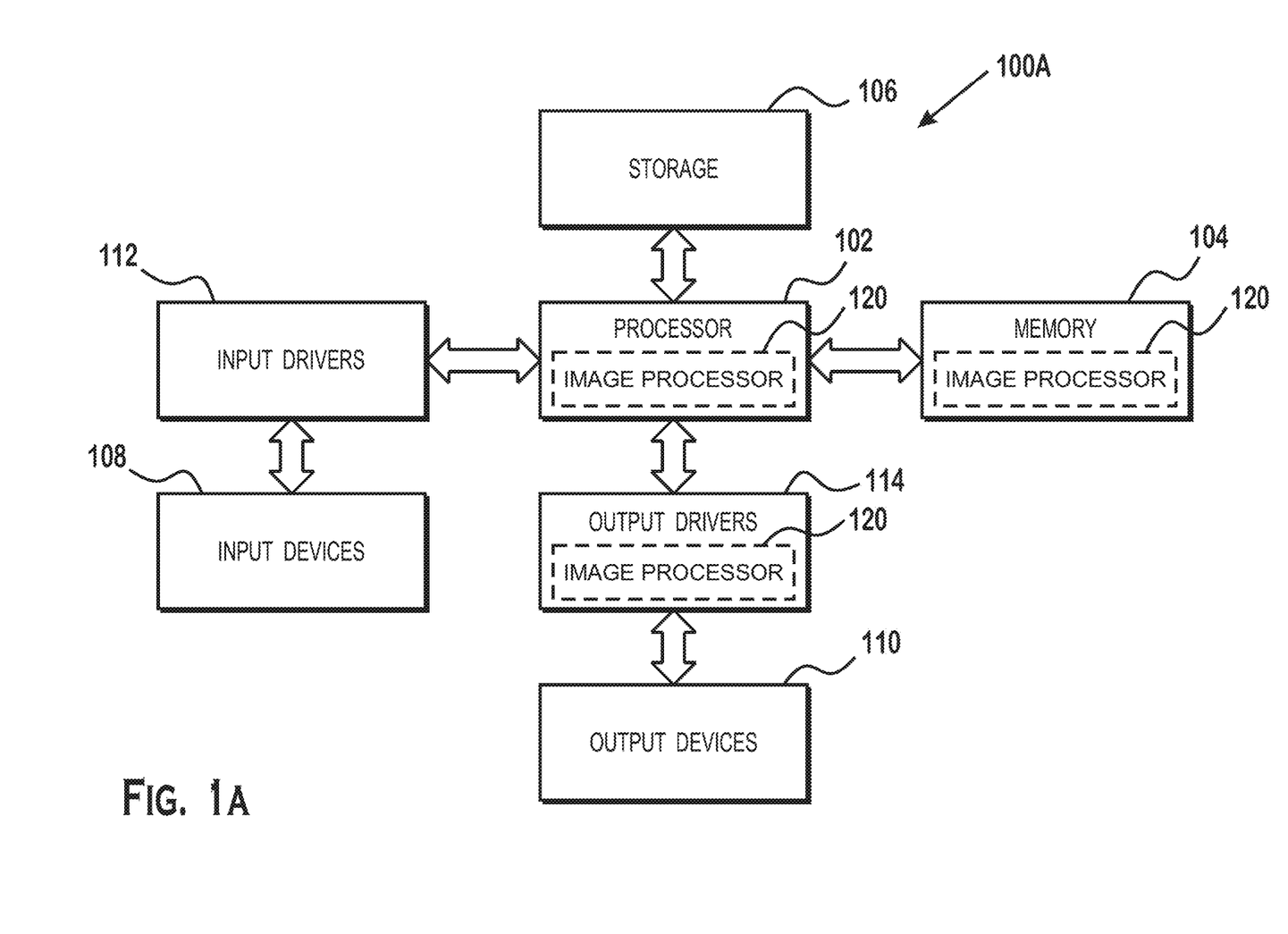
FIG. 1A is a block diagram of an example device in which one or more disclosed implementations may be implemented.

FIG. 1A is a block diagram of an example device 100A in which one or more aspects of the present disclosure are implemented. The device 100A includes, for example, a computer (such as a server, desktop, or laptop computer), a gaming device, a handheld device, a set-top box, a television, a mobile phone, or a tablet computer. The device 100A includes a processor 102, a memory 104, a storage device 106, one or more input devices 108, and one or more output devices 110. The device 100A optionally includes an input driver 112 and an output driver 114. It is understood that the device 100A optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a camera, keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110.

An image processor 120 is shown in two different forms. The image processor 120 obtains images, processes the images, and outputs image processor output. In a first form, the image processor 120 is software that is stored in the memory 104 and that executes on the processor 102 as shown. In a second form, the image processor is at least a portion of a hardware graphics engine that resides in output drivers 114. In other forms, the image processor 120 is a combination of software and hardware elements, with the hardware residing, for example, in output drivers 114, and the software executed on, for example, the processor 102.

The image processor 120 analyzes images stored in memory, such as in memory 104, or any other memory such as a buffer stored in or associated with a hardware implementation of the image processor 120, or any other memory. In various examples, the image processor 120 analyzes sequences of images output by a graphics processor (such as a three-dimensional graphics processing pipeline), or sequences of images stored, for example, as a movie in memory 104, storage device 106, or some other location.

Figure 1B:
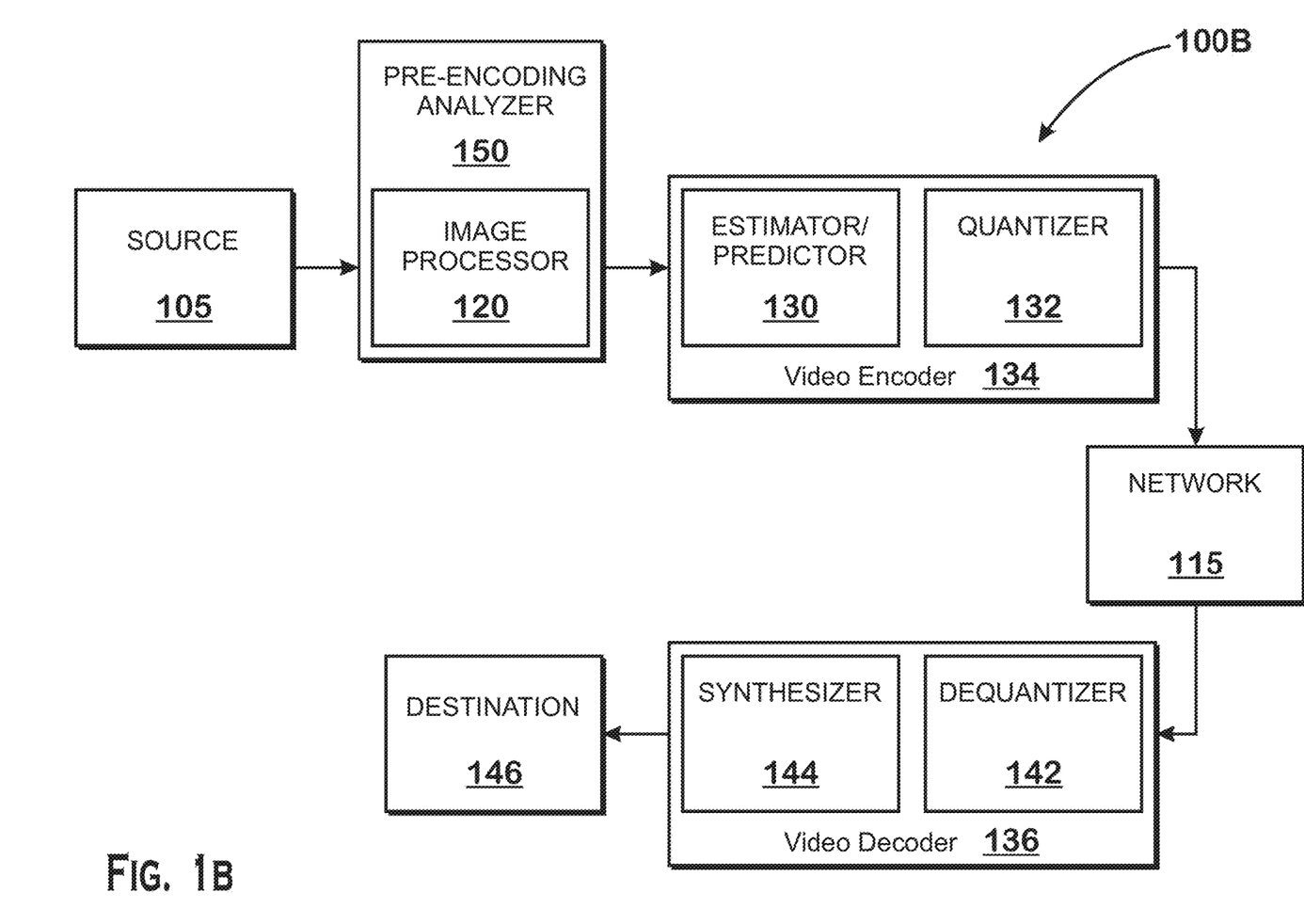
FIG. 1B is a high-level block diagram of a system that uses an image processor in accordance with certain implementations.

FIG. 1B is a high-level block diagram of a system 100B for sending encoded video data or video streams over a network 115 from a source 105 to a destination side 146 in accordance with certain implementations. In this example system 100B, the image processor 120 is included within the pre-encoding analyzer 150 and analyzes images received from the source 105 via an input to inform the video encoder 134 with regards to the manner in which images are to be encoded.

The source 105 includes any device capable of storing, capturing or generating video data that is transmitted to the destination side 146. The device can be, but is not limited to, a mobile phone, an online gaming device, a camera or a multimedia server. The video stream from these devices feeds video encoder(s) 134, which in turn encodes the video stream as described herein below. The encoded video stream is processed by the video decoder(s) 136, which in turn sends the decoded video stream to destination devices, which can be, but are not limited to, an online gaming device and a display monitor.

The video encoder 134 includes, but is not limited to, an estimator/predictor 130 and a quantizer 132. The video decoder 136 includes, but is not limited to, a dequantizer 142 and a synthesizer 144.

In general, video encoding decreases the number of bits required to encode a sequence of rendered video frames by eliminating redundant image information and by reducing entropy. For example, closely adjacent video frames in a sequence of video frames are usually very similar and often only differ in that one or more objects in the scenes they depict move slightly between the sequential frames. The estimator/predictor 130 is configured to exploit this temporal redundancy between video frames by searching a reference video frame for a block of pixels that closely matches a block of pixels in a current video frame to be encoded. The same concept can be used to search for spatial redundancy in the same frame.

Figure 4:
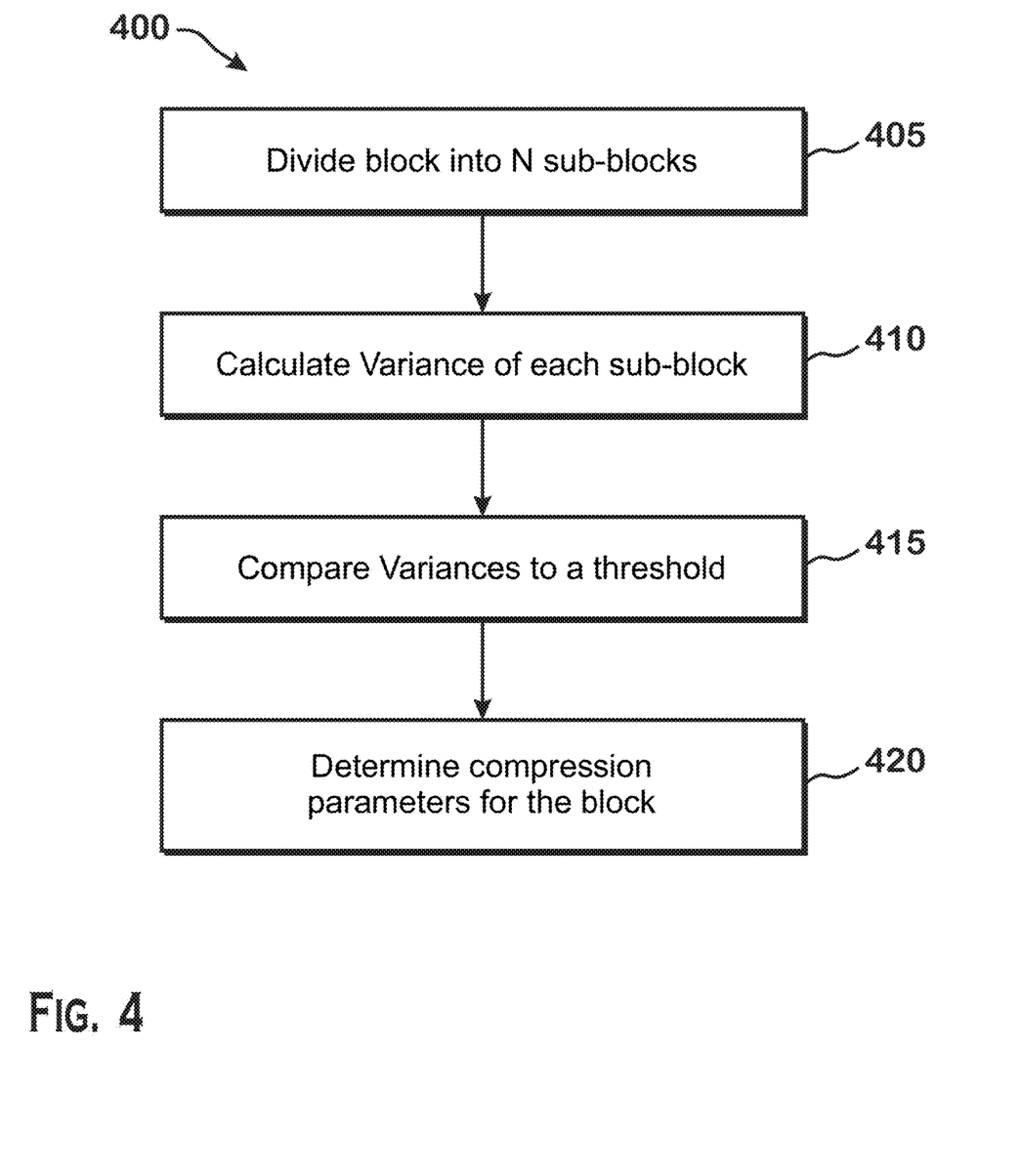
FIG. 4 is an example flow diagram of a technique for dynamically determining compression parameters.

The video encoder 134 implements rate control by implementing the selected compression parameters received from the pre-encoding analyzer 150, which includes the image processor 120, which functions according to method 400. In an implementation, the pre-encoding analyzer 150 is integrated with the video encoder 134. In an alternative implementation, the pre-encoding analyzer 150 is a standalone device.

The quantizer 132 uses the compression parameters to adapt to the varying content and/or available bitrate. The dequantizer 142 processes the decompressed video stream and the synthesizer 144 reconstructs the video stream before transmitting it to the destination 146.

Figure 2:
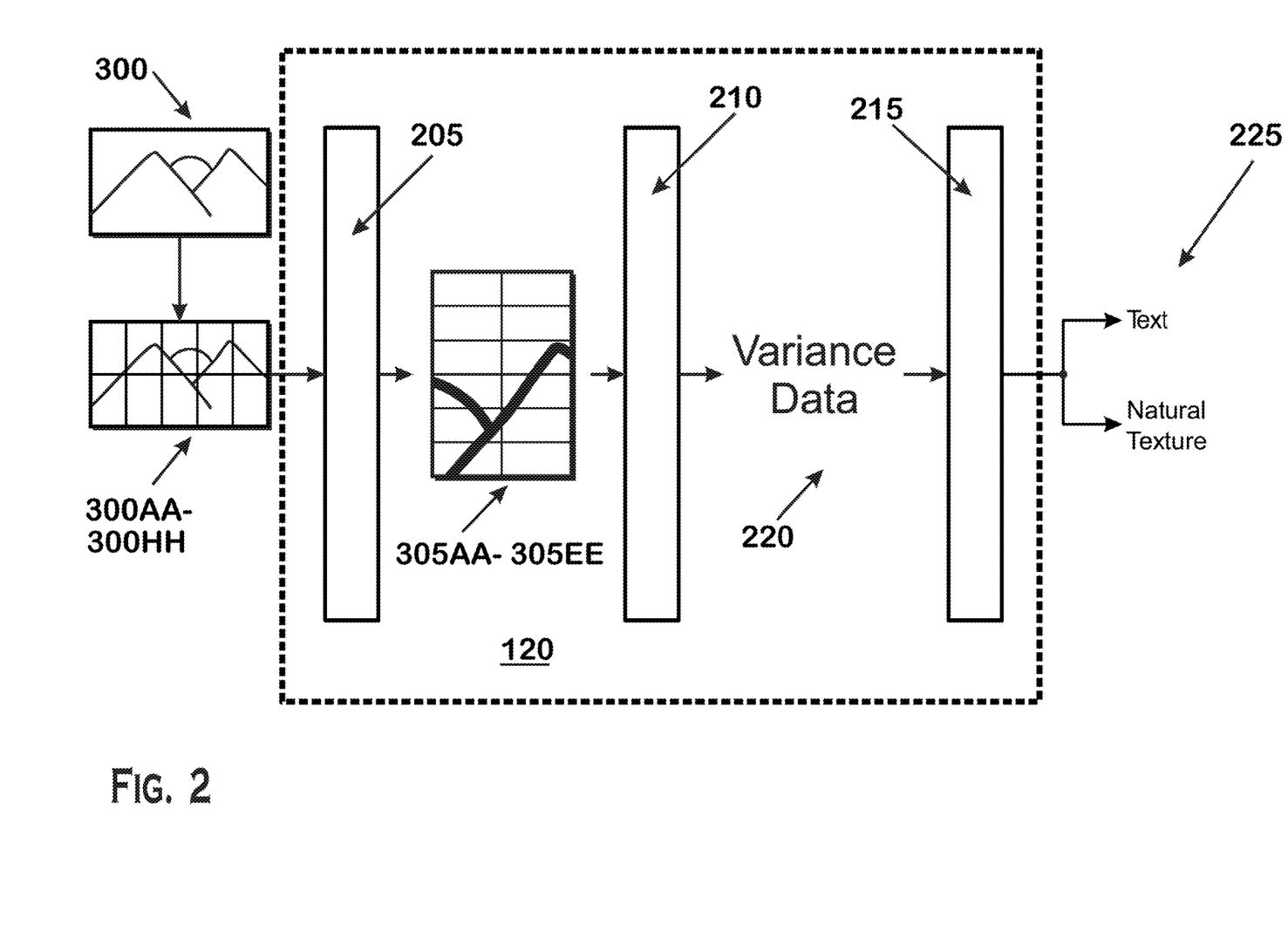
FIG. 2 is an illustration of an image processor in accordance with certain implementations.

FIG. 2 is an illustration of the image processor 120. The image processor 120 receives a plurality of blocks 300AA-300HH of an image 300. The blocks of the image are received from the source 105, the memory 104 or the processor 102. In some implementations, the processor 120 receives the image 300 and forms the blocks 300AA-300HH. In some implementations, the blocks 300AA-300HH are macroblocks or "coding tree units" as defined in the H.265 video compression standard developed by the Motion Picture Experts Group and the Video Coding Experts Group. The divider 205 then divides each of the blocks 300AA-300HH into sub-blocks 305AA-305EE. The sub-blocks 305AA-305EE are then received by the calculator 210. The calculator 210 then calculates the variance data 220 for the sub-blocks 305AA-305EE. The variance data 220 represents a parameterization of the dispersion of a characteristic value of pixels within the sub-block. In some instances, the characteristic value is the luminance component of the pixels. In other instances, the characteristic value is some other characterization of the colors of the pixels. The variance data 220 may include the statistical variance, the standard deviation, the inter-quartile range (IQR), Mean absolute difference, Quartile Coefficient of Dispersion or Coefficient of Variation of the characteristic values of a sub-block. In some instances, the variance data 220 may include other measures of spatial complexity such as a 2-dimensional sum of absolute differences (2D SAD) or gray-level co-occurrence matrix (GLCM).

The analyzer 215 receives the variance data 220 and classifies the content contained within each of the blocks 300AA-300HH. The analyzer 215 generates a classification result 225 for each of the blocks 300AA-300HH. In some implementations, the classification result 225 includes compression parameters that are specific to the type of content classified by the analyzer 215. For example, a block that is identified as containing text is associated with compression parameters that have a higher quality than blocks that do not contain text.

The classification result 225, in some implementations, is then received by the video encoder 134, which encodes video data according to the classification result. In other implementations, the classification result 225 is used for operations other than encoding video, such as down-sampling, up-sampling, or any other image processing technique that can apply different parameters to different blocks.

Figure 3A:
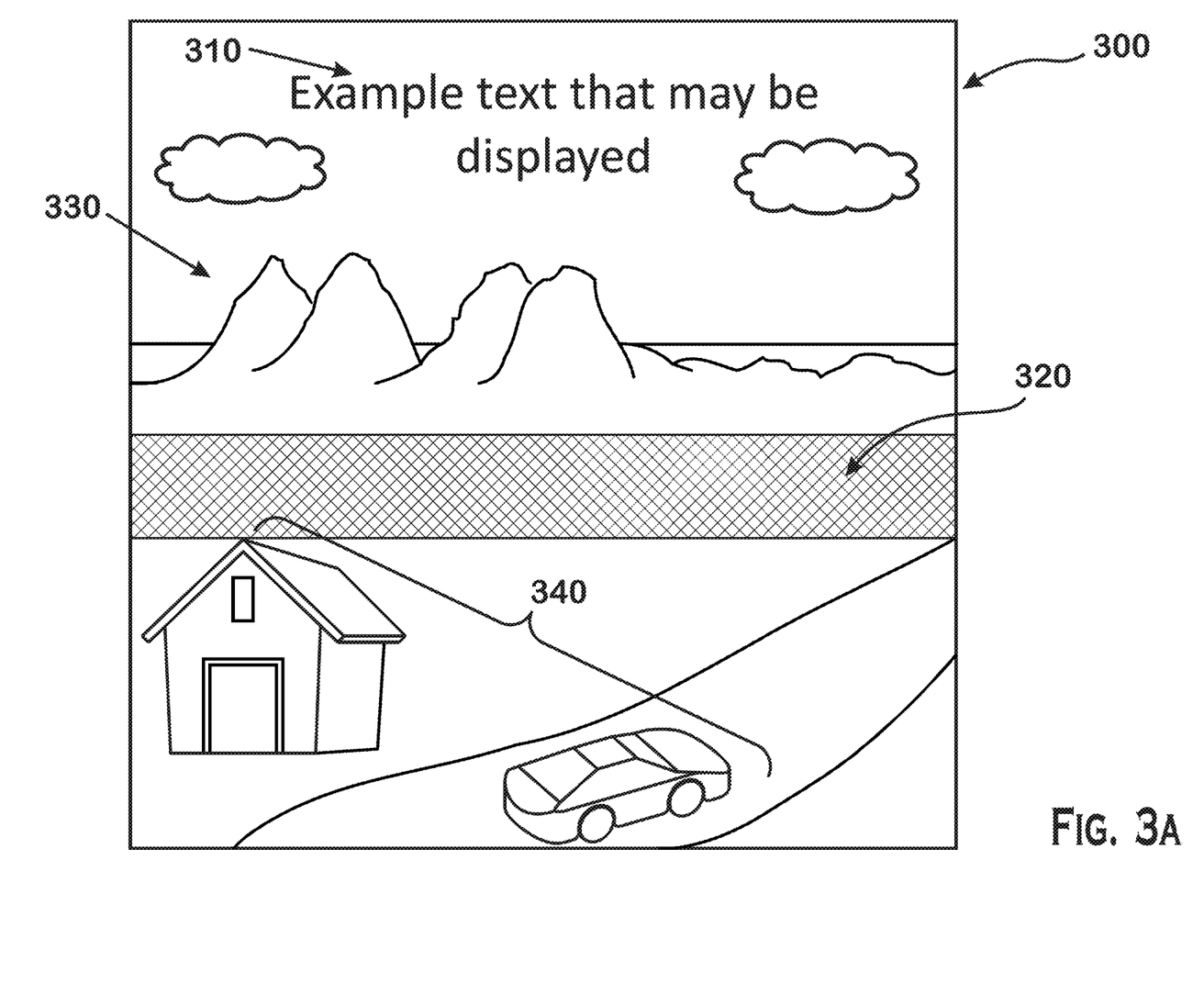
FIG. 3A is an illustration of an image from which blocks can be formed.

FIG. 3A an illustration of an image from which blocks can be formed and analyzed by the image processor 120. The image 300 contains multiple types of content. For instance, image 300 contains text 310, a natural texture 320, a background 330, and foreground content 340. When applying traditional video compression techniques on the image 300, the same compression parameters are used on the entire image. As a result, the same parameters are typically used for blocks that contain text 310, a natural texture 320, a background 330 and foreground content 340.

Traditional compression techniques would determine a single set of compression parameters based on the total composite of image 300. In an example, the traditional techniques would classify image 300 as a natural scene and utilize low quality compression parameters. Applying the low-quality compression parameters to the text 310 would likely render the text 310 illegible if the text is small, or would cause the text 310 to look unpleasant if the text is relatively large.

Figure 3B:
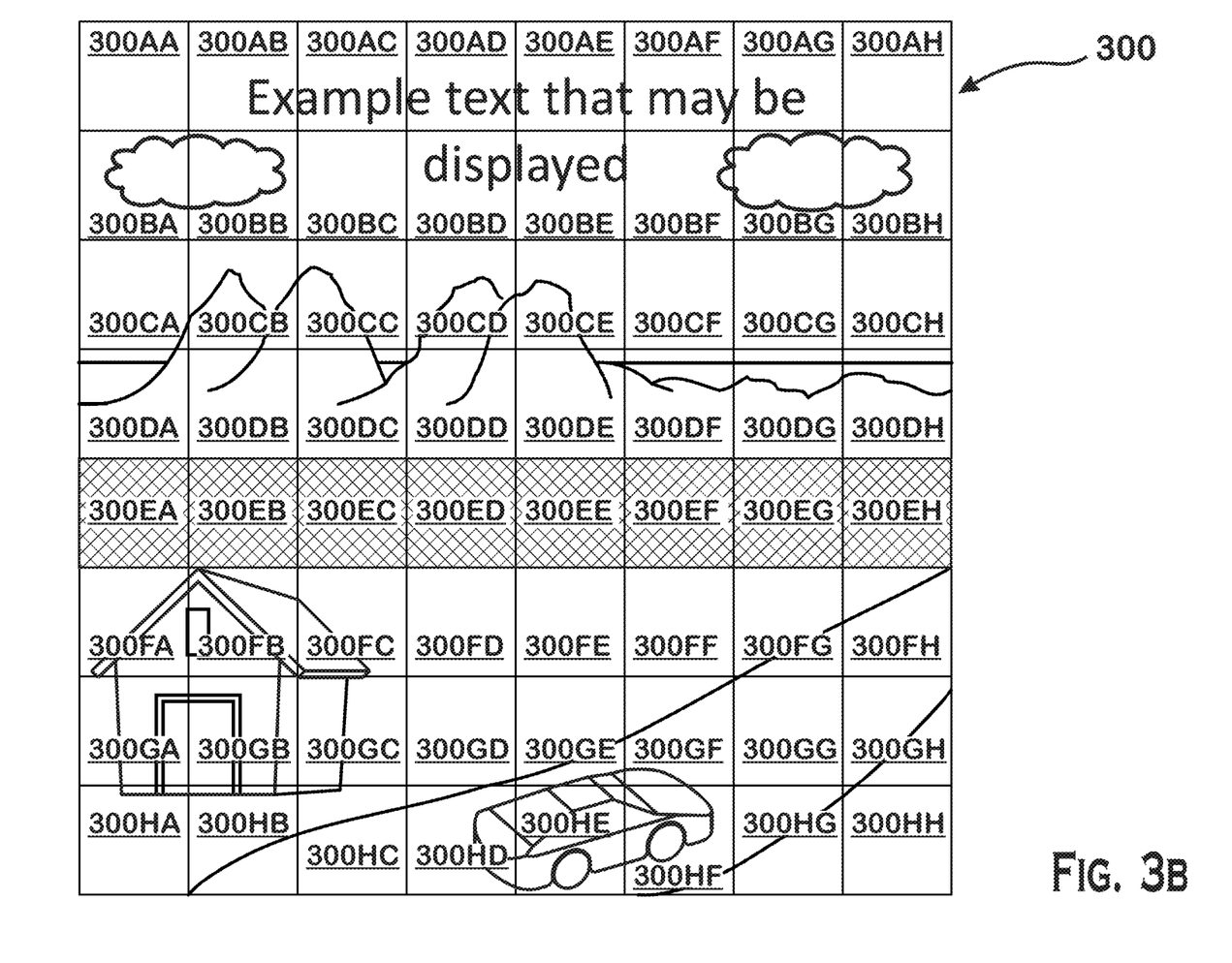
FIG. 3B is an illustration of an image with blocks illustrated.

FIG. 3B shows blocks 300AA-300HH that are formed from image 300. In some implementations, the number of the blocks image 300 is divided into is predetermined. For example, each block may be 64×64 pixels. In other instances, the number of pixels in each block is predetermined based on a targeted output format.

In the example image of FIG. 3B, block 300AC contains text. When encoded using traditional methods, the text is often highly distorted and rendered illegible because text requires high quality compression parameters. In the example image of FIG. 3B, block 300EF contains a natural texture. Distortions and compression artifacts in natural texture are less likely to be distracting to the user. Accordingly, low quality compression parameters are appropriate. Although text and natural textures are discussed, this same technique can be used to analyze images having any content type for which a distinction between hard edges and the lack thereof is useful.

Figure 3C:
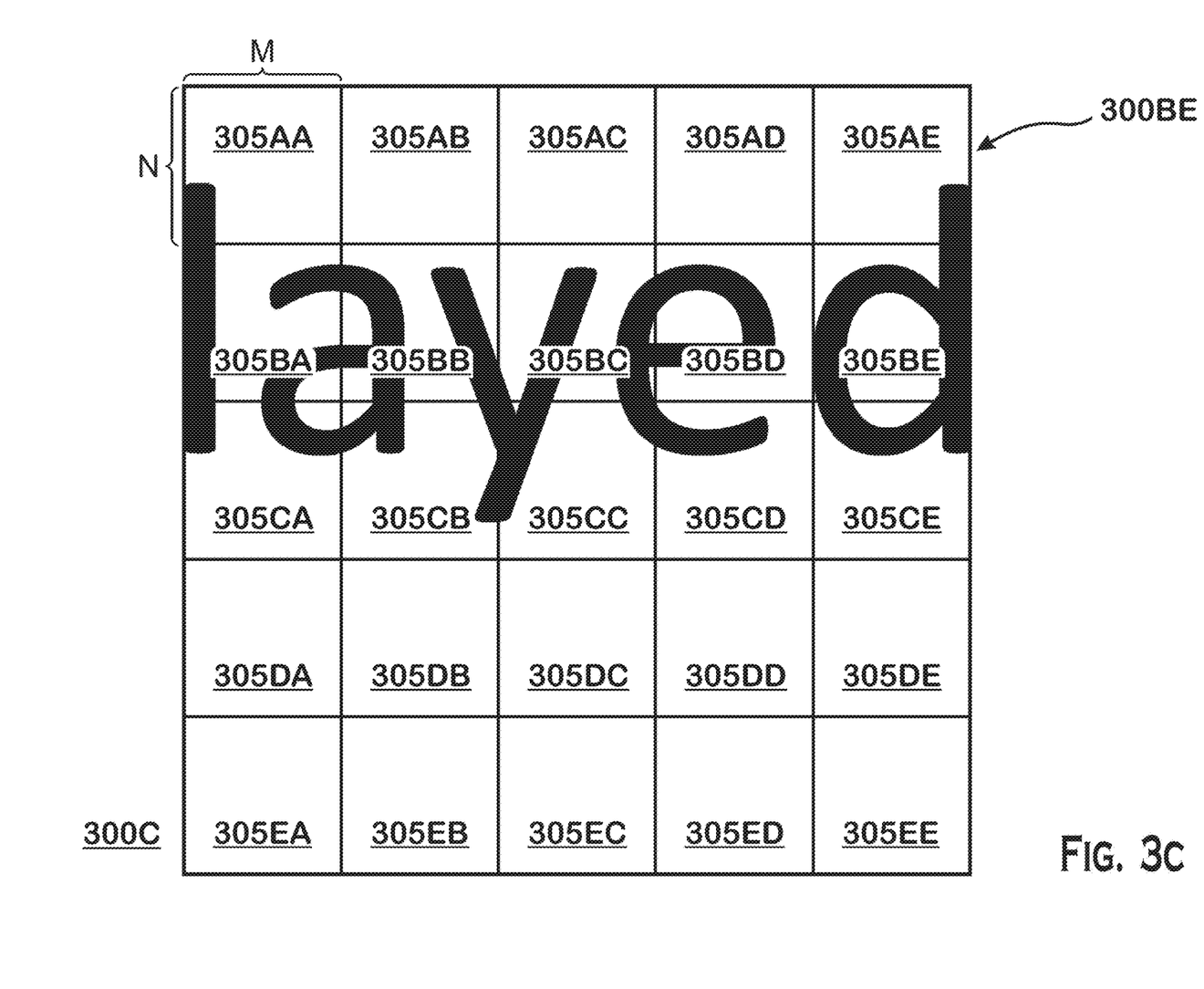
FIG. 3C is an illustration of sub-blocks formed from one of the blocks of FIG. 3B.

FIG. 3C shows sub-blocks 305AA-305EE that are formed for block 300BE. Although illustrated for block 300BE, sub-blocks are formed for each of the blocks 300AA-300HH. Each sub-block is formed from M×N pixels. In some implementations, the numerical values of M and N are predetermined. For example, each sub-block may be 16×16 pixels. In some implementations, the values of M and N are predetermined or may be set based on the unit size of the next processing component. For example, if the video encoder 134 is a High Efficiency Video Coding (HEVC) encoder, the size of each sub block is the same as the coding-tree-unit (CTU) of the HEVC encoder. In another example, if the video encoder 134 is a VP9/AV1 encoder, the sub-block size could be same as the super-block (SB) of the VP9/AV1 encoder.

In other implementations, the number of pixels contained in each sub-block is dynamically determined based on the available resources of the Pre-Encoding Analyzer 150. For example, larger sub-blocks may be used when the resources of the Pre-Encoding Analyzer 150 are low and smaller sub-blocks used as the resources of the Pre-Encoding Analyzer 150 increase. In yet other implementations, the size of the sub-block is dynamically determined based on dynamic region of interest (ROI) detection. For example, smaller sub-blocks are utilized closer to the ROI and larger sub-blocks are utilized further from the ROI.

FIG. 4 is a flow diagram of a method 400 for determining compression parameters to be applied to particular blocks, according to an example. In various implementations, the method 400 is performed by the image processor 120. In step 405, the divider 205 divides the blocks 300AA-300HH into sub-blocks 305AA-305EE. In some implementations, the number of sub-blocks the divider 205 divides the image 300AA-300HH into is predetermined or established based on a target output formation (i.e., H.264/AVC). In other implementations, the number of blocks is statically or dynamically determined based on the block size of each of blocks 300AA-300HH.

In step 410, the calculator generates variance data 220 for each of the sub-blocks 305AA-305EE. In some implementations, the variance data 220 is generated based on the pixel luminosities. In an implementation, the luminosity of a particular pixel of a sub-block is determined based on a weighted average of the red, green and blue components of each of the pixels of the block. In other implementations, the variance data 220 is based on values that are based on luminosities calculated in some manner (such as, as a weighted average of red, green, and blue components of each pixel). In these implementations, the variance data 220 is based on gamma values that are generated by applying a transformation function to luminosities of a pixel.

Next, in step 415, the analyzer 215 analyzes each of the variance data 220 to determine the type of content contained in each of the blocks 300AA-300HH.

One technique by which the analyzer 215 determines the type of content contained in a block is by calculating a block variance based on the variance data 220 of each of the sub-blocks 305AA-305EE. The block variance parameterizes the dispersion of the variance data 220 of each of the sub-blocks 305AA-305EE. In some instances the block variance is the standard deviation of the variance data 220 of each of the sub-blocks 305AA-305EE. In other instances the block variance is the inter-quartile range (IQR), Mean absolute difference, Quartile Coefficient of Dispersion, Coefficient of Variation or range of the variance data 220 of each of the sub-blocks 305AA-305EE.

The block variance is then compared to a threshold. In some implementations, the threshold is predetermined based on a training set of images. In other implementations the threshold is dynamically determined based on the variance data 220 of each of the sub-blocks 305AA-305EE.

The result of comparing the block variance to the threshold indicates the content type. For instance, if the block variance is above the threshold, then the block is considered to contain a content type of text or hard edges. If the block variance is below the threshold, then the block is considered to contain a content type that does not have text or hard edges.

A block that contains solid colors will demonstrate a low block variance because all of the pixels within each of the sub-blocks are a single color. Accordingly, the variance data 220 for each of the sub-blocks 305AA-305EE will be close to zero since all of the pixels have the same color. Since each of the sub-blocks contain variance data 220 with approximately the same value (zero), the block variance will also be close to zero.

The block variance of a block that contains natural content, noise or gradients will also have a low block variance. In this case, the variance of each of the sub-blocks 305AA-305EE will be large. The 305AA-305EE variance will be large because natural content generally includes continuous distributions of color and intensity. However, since the variance data 220 of each of the sub-blocks 305AA-305EE is large, the block variance will be small.

Blocks that contain text content produce sub-blocks 305AA-305EE where some of the sub-blocks have variance data 220 that is large and other sub-blocks where the variance data 220 is small. The large variance data 220 is produced by sub-blocks that contain both the text and the background. Other blocks will only contain the background and therefore will appear as a single color with small variance data 220. Accordingly, the block variance will be large because it contains blocks with a small variance and blocks with a large variance. As a result, text content will have values greater than the threshold value that is indicative of the content classification.

For example, when a sub-block such as 305BB (which contains part of a 'Y' and part of an 'A') is analyzed, the variance data 200 for sub-block 305BB includes a variance of 1000. When a sub-block only containing the background such as 305ED is analyzed the variance data 200 for sub-block 305ED includes a variance of zero. Therefore, 300BE has a block variance of 200, which is greater than a threshold value of 100, and therefore can be identified as containing text content.

Optionally, in step 420, the analyzer 215 determines compression parameters for each of the blocks 300AA-300HH based on the type of content identified in step 415. The compression parameters may include a Quantization Parameter (QP) or similar "quality knob" (named differently than QP) that allow the encoding quality to be changed on each "unit" of pixels that are encoded together.

By changing the compression parameters, the amount of processing and transmission bandwidth required can be adjusted. For example, high-quality parameters such as low QP value (e.g., QP value close to 0) are used for blocks that contain content that is particularly important to the user (i.e., text) or is particularly prone to compression artifacts (i.e., human faces). Alternatively, low-quality parameters such as high QP value (e.g., QP value close to 51) are used for blocks that content that is less important to the user (i.e., natural textures) or less prone to compression artifacts (i.e., solid colors). Once the compression parameters are determined in step 420, the parameters are then utilized by the video encoder 134 to compress the video.

Figure 5A:
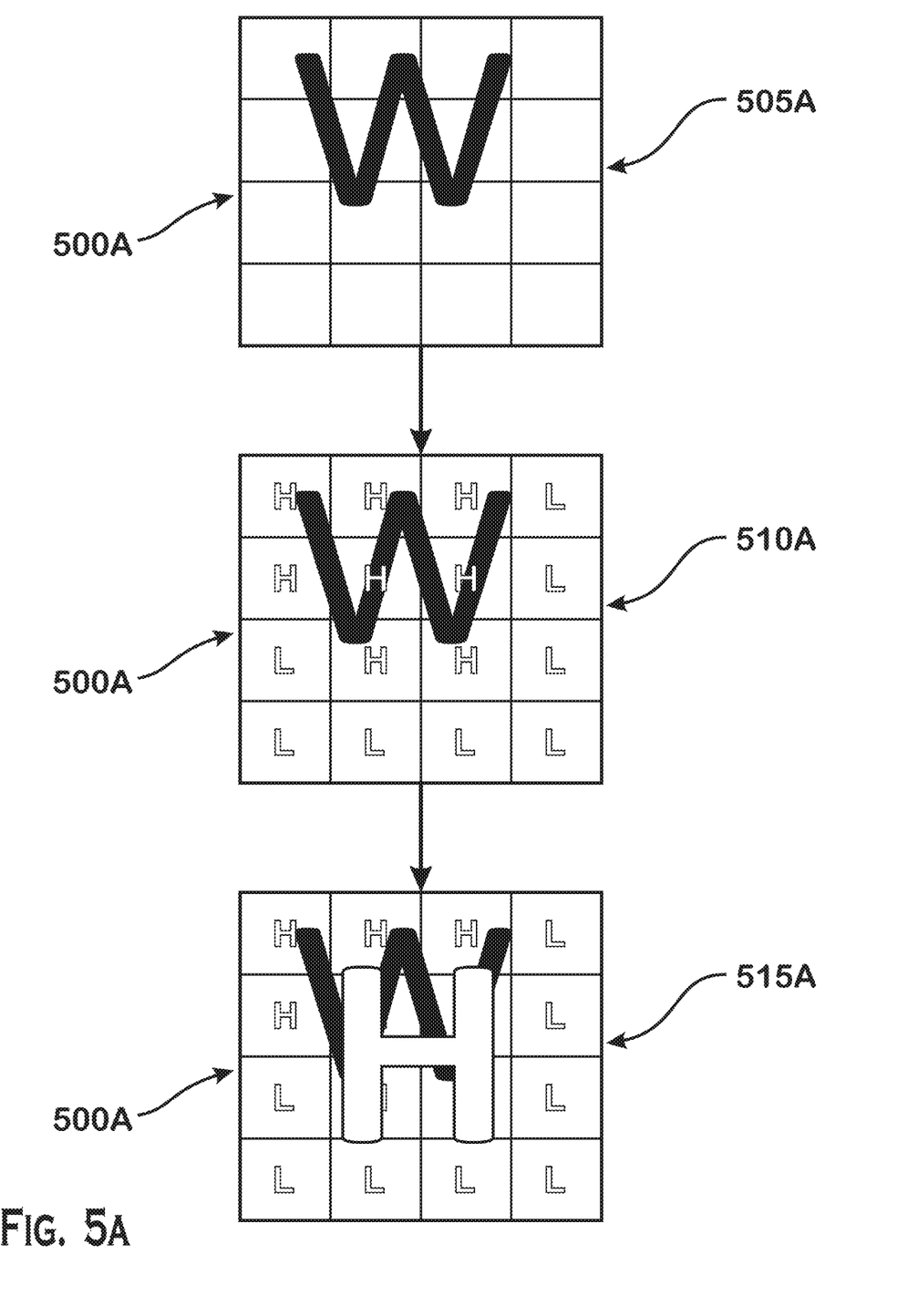
FIG. 5A depicts example images that illustrate an example of sub-blocks of an example block that may be analyzed.

FIG. 5A shows an example of a block 500A containing the letter 'W' that is analyzed. 505A shows the sub-blocks formed from the block 500A. 510A graphically illustrates the variance data 200 that is calculated for each of the sub-blocks. An 'H' value indicates a sub-block with high variance data 220. An 'L' value indicates a sub-block with low variance data 220. 515A illustrates that the block variance of the block 505A is high as indicated by the 'H'. Accordingly, when analyzed in step 415, the image processor 120 classifies block 500A as containing text.

Figure 5B:
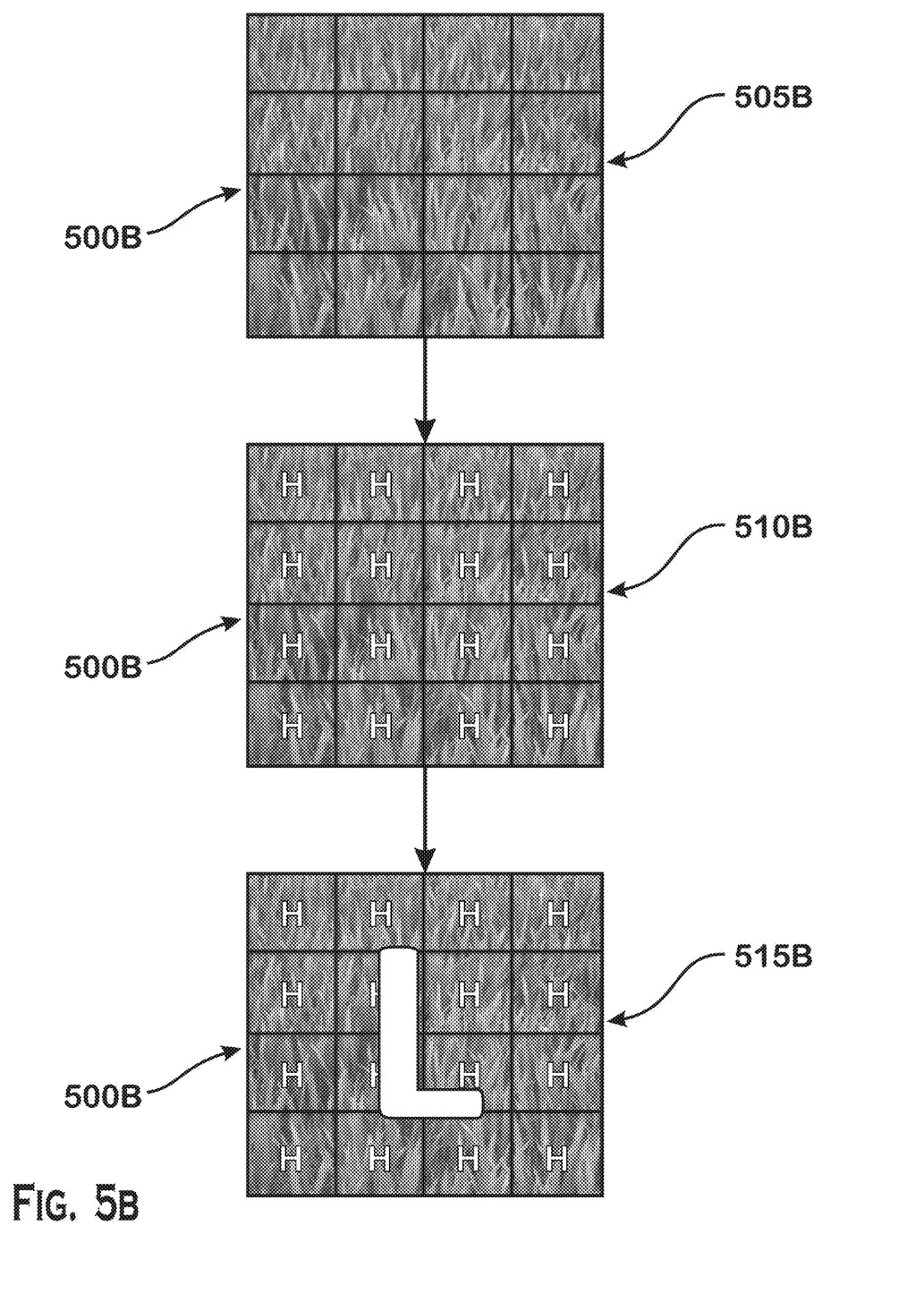
FIG. 5B depicts example images that illustrate an example of sub-blocks of another example block that may be analyzed.

FIG. 5B shows an example of a block 500B containing a natural texture (i.e., grass) that is analyzed. 505B shows the sub-blocks formed from the block 500B. 510B graphically illustrates the variance data 200 that is calculated for each of the sub-blocks. An 'H' value indicates a sub-block with high variance data 220. An 'L' value indicates a sub-block with low variance data 220. 515B illustrates that the block variance of the block 505B is high as indicated by the 'L'. Accordingly, when analyzed in step 415, the image processor 120 classifies block 500B as not containing text.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for dynamically encoding an image, the method comprising:
receiving a block of a video stream;
dividing the block of the video stream into a plurality of sub-blocks;
calculating respective variance data for each of the plurality of sub-blocks, wherein each variance data represents a parameterization of a dispersion of pixel intensities within each respective sub-block;
determining a variance of the block of the video stream, wherein the variance of the block represents the parameterization of the dispersion of the variance data of each of the sub-blocks, wherein the variance of the block is any one of a standard deviation, an inter-quartile range (IQR), a mean absolute difference, a quartile coefficient of dispersion, or a coefficient of variation of the variance data of each of the sub-blocks;
classifying the block based on the determined variance of the block;
selecting encoding parameters for the block based on the classification, wherein the encoding parameters include compression parameters specific to a content type of the block such that the compression parameters for a block containing text have a higher quality than compression parameters for a block not containing text; and
encoding the block based on the encoding parameters.

2. The method of claim 1, further comprising:
dividing the video stream into a plurality of blocks, wherein the plurality of blocks include the block.

3. The method of claim 1, wherein the respective content type is determined to be text in response to the variance of the block exceeding a threshold.

4. The method of claim 3, wherein the encoding parameter selected for text includes a Quantization Parameters (QP) that is lower than for other content types.

5. The method of claim 1, wherein the variance data is a standard deviation.

6. The method of claim 5, wherein the variance data is an Interquartile Range.

7. An encoding system comprising:
an input configured to receive a block of a video stream;
a pre-encoder configured to:
receive the block from the input;
divide the block of the video stream into a plurality of sub-blocks;
calculate respective variance data for each of the plurality of sub-blocks, wherein each variance data represents a parameterization of a dispersion of pixel intensities within each respective sub-block;
determine a variance of the block of the video stream, wherein the variance of the block represents the parameterization of the dispersion of the variance data of each of the sub-blocks, wherein the variance of the block is any one of a standard deviation, an inter-quartile range (IQR), a mean absolute difference, a quartile coefficient of dispersion, or a coefficient of variation of the variance data of each of the sub-blocks;
classify the block based on the determined variance of the block; and
select encoding parameters for the block based on the classification, wherein the encoding parameters include compression parameters specific to a content type of the block such that the compression parameters for a block containing text have a higher quality than compression parameters for a block not containing text; and
an encoder configured to encode the block based on the encoding parameters selected.

8. The encoding system of claim 7, wherein the block is formed by dividing the video stream into a plurality of blocks.

9. The encoding system of claim 7, wherein the respective content type is determined to be text in response to the variance of the block exceeding a threshold.

10. The encoding system of claim 9, wherein the encoding parameter selected for text includes a Quantization Parameters (QP) that is lower than for other content types.

11. The encoding system of claim 7, wherein the variance data is a standard deviation.

12. The encoding system of claim 7, wherein the variance data is an Interquartile Range.

13. A non-transitory computer-readable medium storing instructions that, when executed by a processor, cause the processor to perform operations for dynamically encoding an image, the operations comprising:

receiving a block of a video stream;

dividing the block of the video stream into a plurality of sub-blocks;

calculating respective variance data for each of the plurality of sub-blocks, wherein each variance data represents a parameterization of a dispersion of pixel intensities within each respective sub-block;

determining a variance of the block of the video stream, wherein the variance of the block represents the parameterization of the dispersion of the variance data of each of the sub-block, wherein the variance of the block is any one of a standard deviation, an inter-quartile range (IQR), a mean absolute difference, a quartile coefficient of dispersion, or a coefficient of variation of the variance data of each of the sub-blocks;

classifying the block based on the determined variance of the block;

selecting encoding parameters for the block based on the classification, wherein the encoding parameters include compression parameters specific to a content type of the block such that the compression parameters for a block containing text have a higher quality than compression parameters for a block not containing text; and encoding the block based on the encoding parameters.

14. The non-transitory computer-readable medium of claim 13, wherein the respective content type is determined to be text in response to the variance of the block exceeding a threshold.

15. The method of claim 1, wherein the variance data represents a measure of spatial complexity.

16. The encoding system of claim 7, wherein the variance data represents a measure of spatial complexity.

17. The non-transitory computer-readable medium of claim 13, wherein the variance data represents a measure of spatial complexity.

* * * * *